Feb. 26, 1924.

S. BARDY 1,484,754

FILM FEEDING MECHANISM FOR MOVING PICTURE MACHINES

Filed July 20, 1921    4 Sheets-Sheet 1

WITNESS:

INVENTOR
Samuel Bardy
BY
ATTORNEY.

Feb. 26, 1924.

S. BARDY 1,484,754

FILM FEEDING MECHANISM FOR MOVING PICTURE MACHINES

Filed July 20, 1921     4 Sheets-Sheet 4

WITNESS:

INVENTOR
Samuel Bardy
BY
Frank L. Busser
ATTORNEY.

Patented Feb. 26, 1924.

1,484,754

UNITED STATES PATENT OFFICE.

SAMUEL BARDY, OF PHILADELPHIA, PENNSYLVANIA, ASSIGNOR, BY MESNE ASSIGNMENTS, TO BARDY PROJECTOR CO., OF PHILADELPHIA, PENNSYLVANIA, A CORPORATION OF DELAWARE.

FILM-FEEDING MECHANISM FOR MOVING-PICTURE MACHINES.

Application filed July 20, 1921. Serial No. 486,078.

*To all whom it may concern:*

Be it known that I, SAMUEL BARDY, a citizen of the United States, residing at Philadelphia, county of Philadelphia, and State of Pennsylvania, have invented a new and useful Improvement in Film-Feeding Mechanism for Moving-Picture Machines, of which the following is a full, clear, and exact description, reference being had to the accompanying drawings, which form a part of this specification.

This invention relates to an improvement in moving picture projecting machines in which the film strip is continuously moved and the object is projected to appear stationary on the screen by means of an optical compensating system which tends to move the picture on the screen in the reverse direction to the movement of the image, and at the same speed, so that the picture on the screen appears to be stationary to the eye of the observer.

In devices of this character the optical compensating system and the film must be moved in synchronism when a picture is exhibited, and as the optical compensating system is very heavy it is impracticable to stop the compensating system each time it is desired to stop the film feed or when changing films.

The object of my invention is to provide means for connecting the film feed sprocket wheel with the compensating system, which is so arranged that the successive pictures will be in timed relation to the compensating system.

Another object of my invention is to provide an adjustable device which is arranged to be adjusted to permit the centering of the pictures on the film strip with relation to the compensating system.

A further object of my invention is to provide simple and efficient actuating means for throwing the connecting means into and out of action, as well as means for maintaining the connecting means in either of its thrown positions by centrifugal force.

Still another object of my invention is to provide automatic means for controlling circuits which are arranged to prevent the closing of the circuit to throw the connecting means into action if the connecting member on the film feed sprocket wheel is locked in a predetermined position, as when changing the film.

A still further object of my invention is to provide separate spindles for the film feed sprocket wheel and the compensating system so that all danger of transmitting vibration to the film from the compensating system will be avoided, which vibration may be caused by slight looseness in the bearings for the compensating system, and at the same time provide direct driving connecting means between the compensating system and the film feed which will avoid all danger of lost motion between said devices.

The precise nature of my invention will be best understood by reference to the accompanying drawings, which illustrate one form of my invention, it being premised, however, that changes may be made in the details of construction and the general arrangement of the parts without departing from the spirit and scope of my invention as defined in the appended claims.

Figure 1:
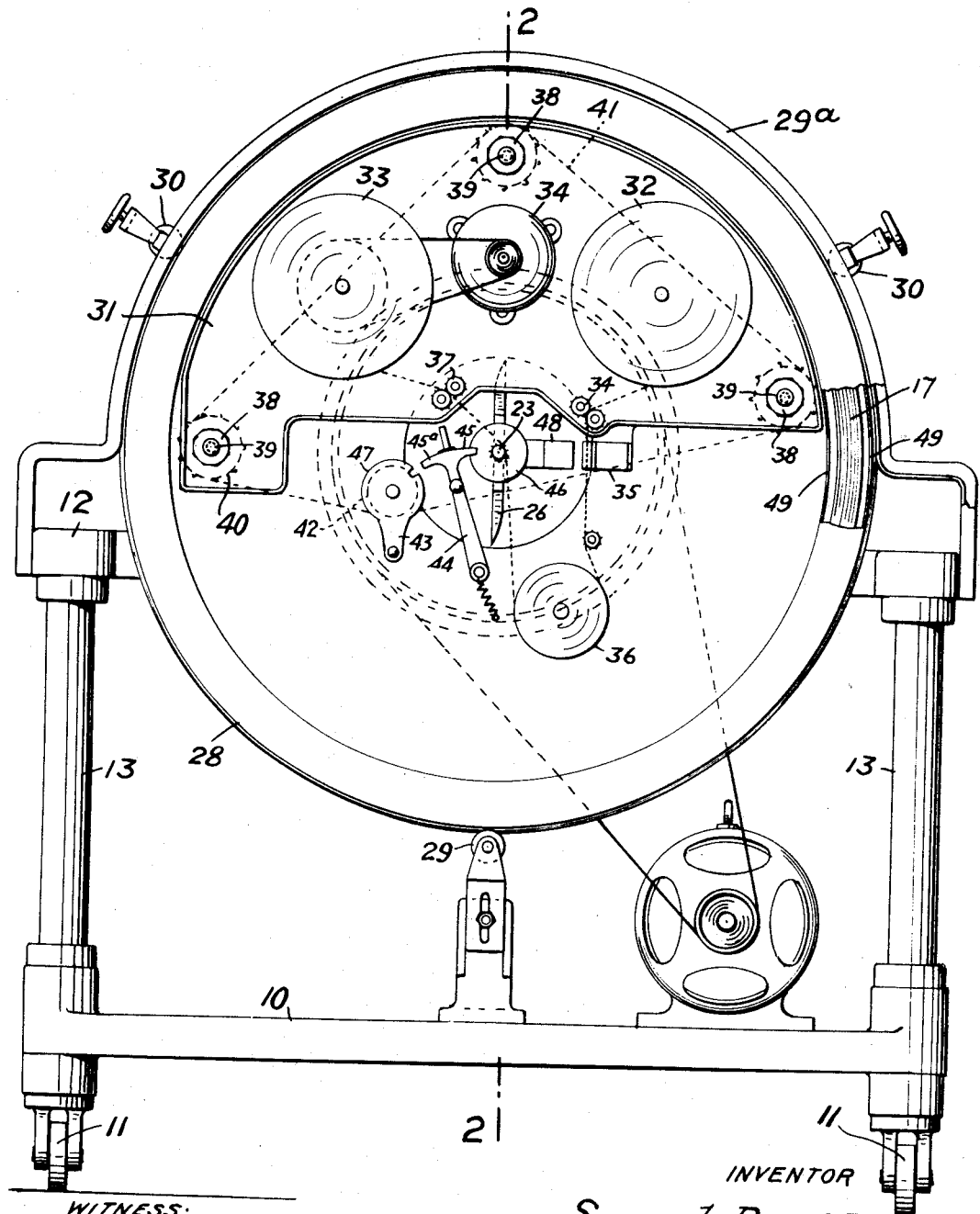
Fig. 1 is a face view, somewhat diagrammatic, of one form of device with my improved driving mechanism attached thereto.

In these drawings, the reference character 10 designates a bed plate supported on castors 11. 12 is a supplemental bed plate supported on the bed plate 10 by means of four columns 13. This supplemental bed plate 12 is U-shaped, the openings between the legs being at the front of the machine to permit access to the various parts by the operator.

Mounted on the leg connecting member of the U-shaped supplemental frame at the back of the machine is a bearing 14. This bearing is split, the base member thereof being bolted to the supplemental frame, while the cap thereof is bolted to the base member.

Secured within the bearing 14 between the cap and base member is a spindle 15, on which is rotatably mounted a lens drum or what I term the optical compensating system. 16 is the hub of the lens drum mounted on ball bearings between the hub and the spindle 15. The drum proper comprises two L-shaped rings 17 connected to each other by means of four rods 18, which are in turn connected to the four spokes 19 extending from the hub 16. The optical compensating system comprises four lenses, there being one lens between adjacent rods 18. Each lens comprises a plurality of sections 20 mounted between the rings 17, and are of the same type as those set forth in my Patent No. 1,316,669, of September 23, 1919, and my application Serial No. 450,575, filed March 8, 1921.

21 is a driving pulley for the lens drum which is connected to the spokes 19 and which may be driven from any suitable source, such as an electric motor.

The spindle 15 is hollow, and rotatably mounted therein is a shaft 22 to which is adjustably connected a film feed sprocket wheel 23. The shaft 22 is provided with a conical bearing portion near each end thereof seated in conical seats in bushings 24. These bushings are threaded in openings in the ends of the spindle 15 and are arranged to be adjusted therein to take up wear on the shaft as well as to permit a slight longitudinal adjustment thereof. 25 are lock nuts for locking the bushings in position in the spindle 15. Adjustably connected to the shaft 22 is a double armed clutch member 26. These arms are oppositely disposed and extend radially into the path of a rocking clutch member 27 carried by the hub 16, the arrangement being such that when the lever 27 is in one position the shaft 22 and the film feed sprocket wheel will be driven by the lens drum, and when said lever is in its other position the drum will be free to rotate and the shaft 22 will remain stationary. The clutch member 26 is adjustable on the shaft 22, or relative to the film feed sprocket wheel in order to synchronize the pictures on the film fed by the sprocket and the optical system. In other words, the relation between the drum and sprocket wheel must be such that when the two are in driving relation the rays of light which are projected through the center of each picture must be projected through the center of its compensating lens.

Figure 2:
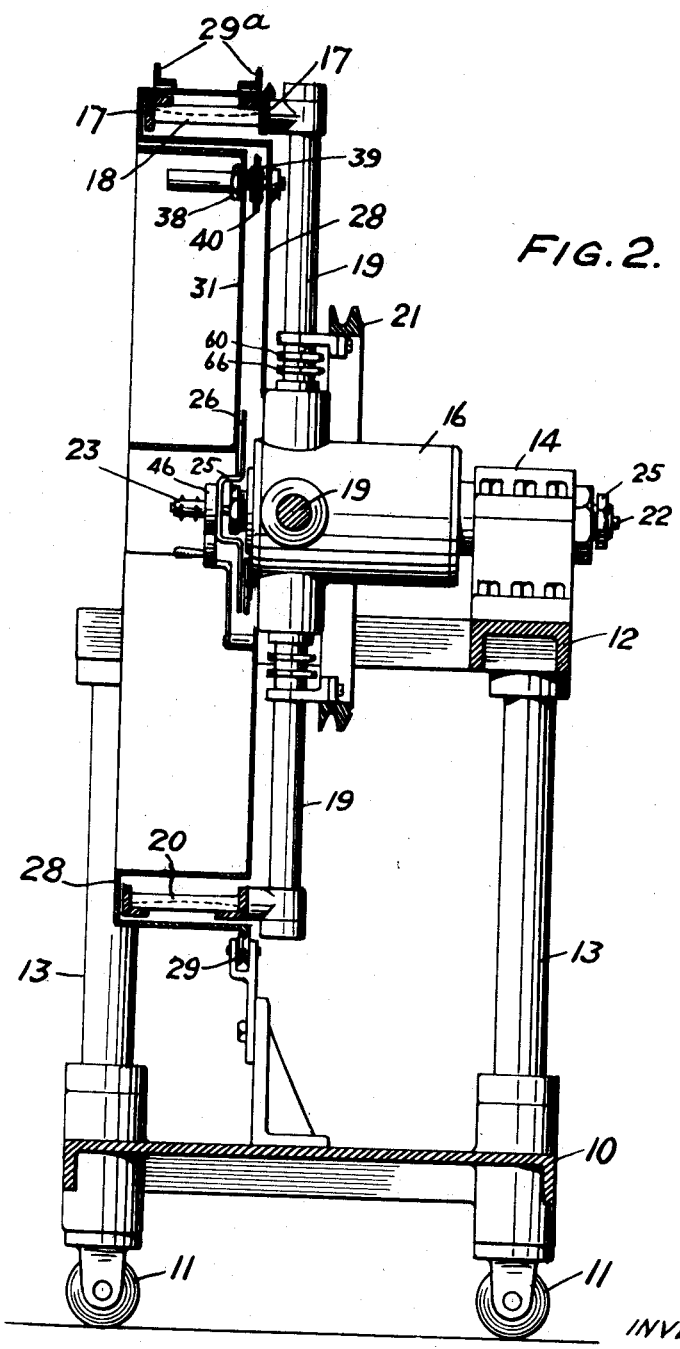
Fig. 2 is a vertical sectional view on the line 2—2 of Fig. 1 with some of the parts omitted for clearness.
Figure 3:
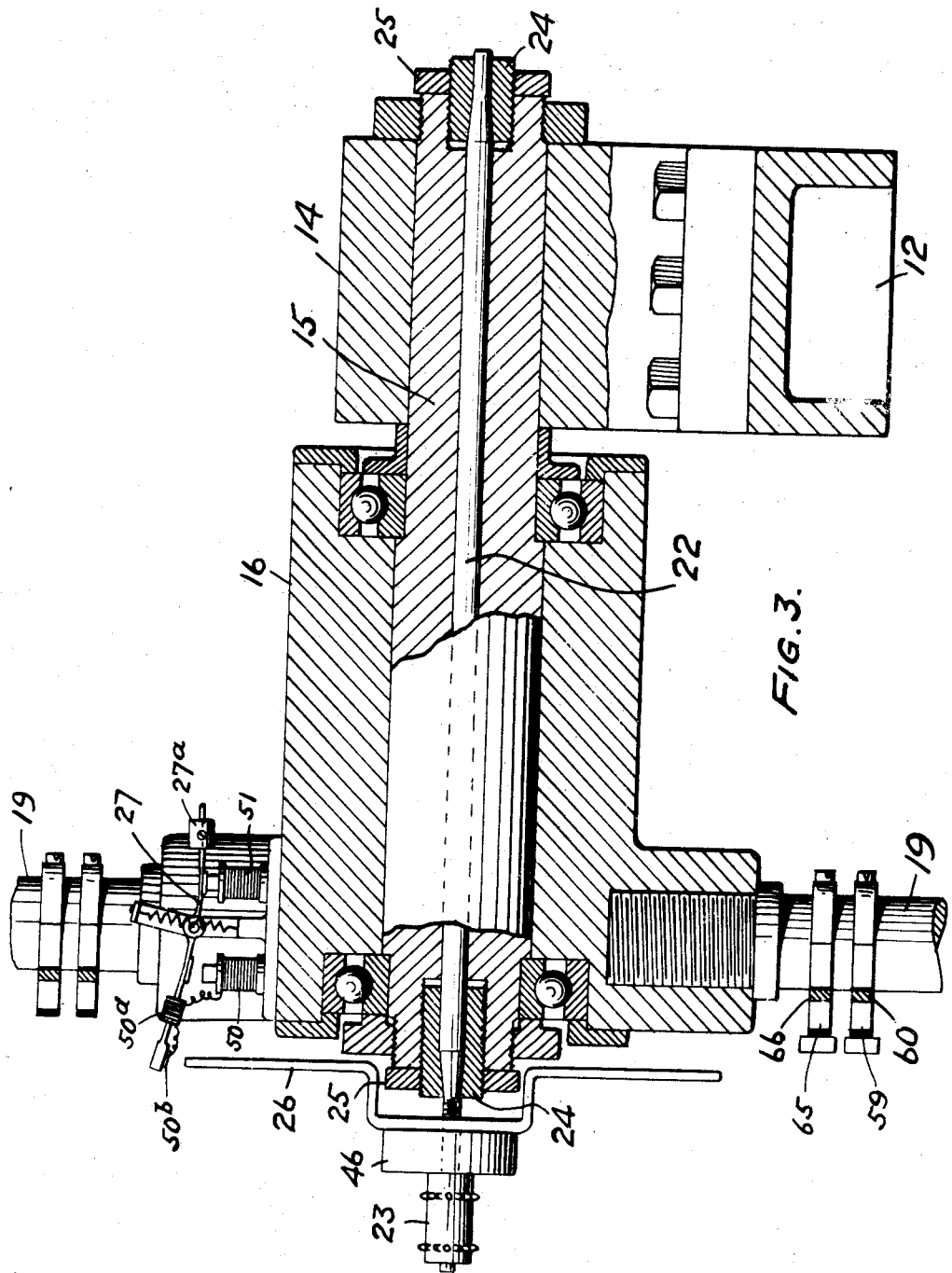
Fig. 3 is a sectional view through the hub on a larger scale.
Figure 4:
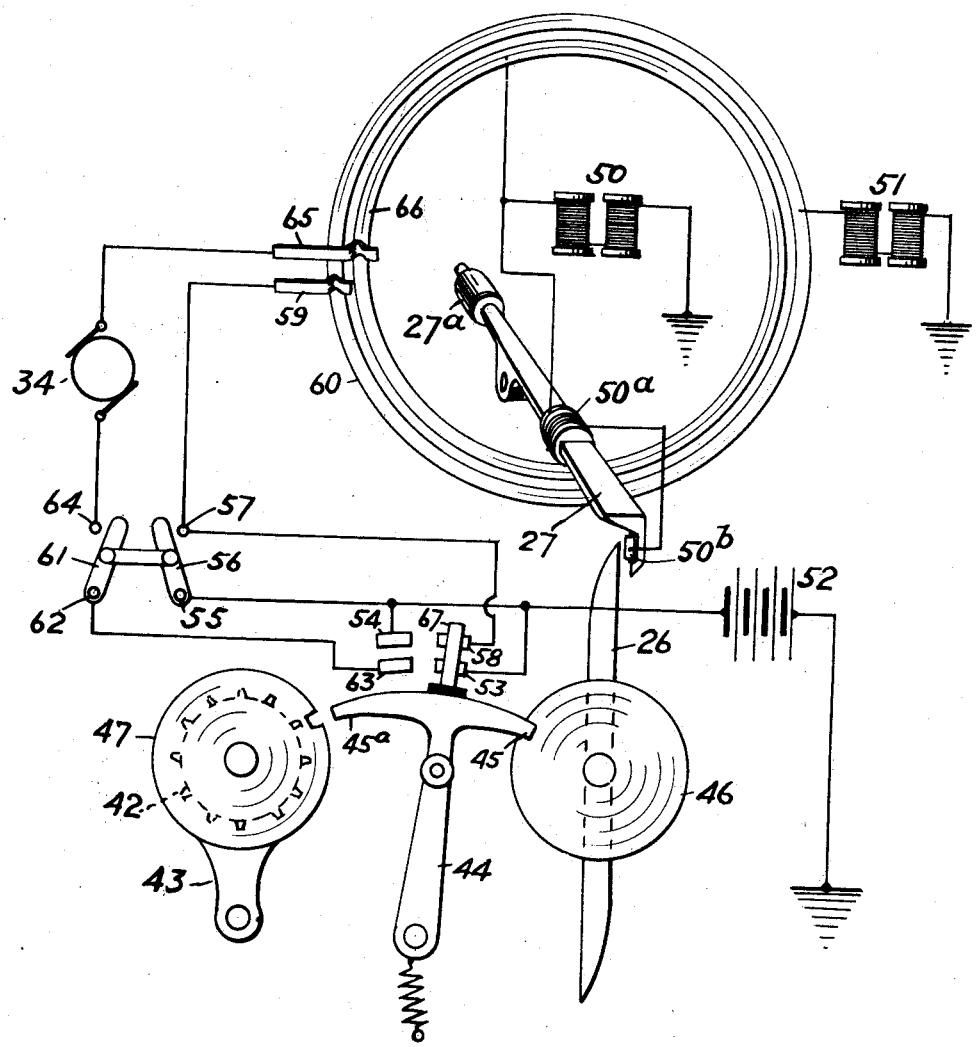
Fig. 4 is a diagram illustrating the electrical connections for the clutch.

Mounted for adjustment about the axis of the drum and shaft 22 is a combined supporting frame and drum shield 28. This frame is supported between a roller 29 on the bed plate 10 and rollers 30 on an arched frame 29ª connected to the supplemental bed plate 12. The frame 28 is provided with an annular channel, closed at the front and two sides and open at the back, as clearly shown in Fig. 2, in which the compensating lenses and their supporting rings are arranged to rotate, and forms a protecting shield to prevent the operator coming in contact with any portion of the drum at the front of the machine. This frame is also provided with a wide annular flange in front of the spokes 19 of the drum for supporting the different elements hereinafter described, the opening in the center of the frame flange being of sufficient diameter to permit the free rotation therein of the rocking clutch member 27 whether in or out of clutching position.

Mounted for movement in a line parallel to the axis of the drum and within the frame and shield 28 is a magazine 31 for the film feeding and take-up reels 32 and 33, respectively. These reels are mounted on suitable spindles carried by the magazine, and 34 is a motor also carried by the magazine for driving the take-up reel when the film is fed by the sprocket wheel 23 as hereinafter described.

The film passes from reel 32 between guide rollers 34 carried by the magazine, in front of the projecting lens 35 carried by frame 28, around a film measuring wheel 36 (such as described in my above-entitled application), around the film feeding sprocket wheel 23, then between another set of guide rollers 37 carried by the magazine to the reel 33.

The magazine is carried by three nuts 38 fixed to the back of the magazine which engage threaded supporting rods 39 rotatably mounted on the frame 28. 40 are sprocket wheels between the back of the magazine 31 and the flange of the frame which are connected to the rods 39 and are interconnected by a sprocket chain 41, so that all of the rods will be simultaneously rotated to move the magazine into and out of the frame 28. Mounted on a spindle on the frame 28 is a sprocket wheel 42 which is also engaged by the chain 41 and is provided with a crank 43 for actuating the chain to shift the magazine 31.

44 is a locking and control lever pivoted to the frame 28, having locking projections 45 and 45ª. 46 is a disc on the hub of the double armed clutch member 26 having a notch therein adapted to be engaged by the locking projection 45 when the locking lever is in one position to hold the film feed sprocket wheel in a predetermined position when changing films to enable the operator to properly place the film on the feed sprocket wheel 23. 47 is a similar disc connected to the sprocket wheel 42 having a notch which is engaged by the projection 45ª when the magazine is in its film feeding position and is locked in such position by the lever 44.

The frame 28 not only carries the magazine, but also carries the synchronizing mechanism such as set forth in my above-entitled application, the projecting lens 35, a suitable light projecting prism 48, lamp house, etc.

This frame is provided with openings 49 through the sides of the drum enclosure, in line with the projecting lens, through which the light is projected through the compensating system to the screen.

A suitable shutter mechanism of approved type may also be mounted on the frame in line with the projecting lens, and as all of the parts are carried by the frame, the direction of the light rays can readily be adjusted to various angles about the axis of the drum to project them onto the screen, without shifting any of the various parts relative to each other.

When it is desired to change the film during the operation of the machine, the current to the motor 34 is cut off and the rocking clutch member 27 is rocked, as hereinafter described, out of the path of the clutch member 26. The lever 44 is then shifted into engagement with the notch in disc 46 to lock the feed sprocket 23 and free the disc 47 and sprocket wheel 42. The crank 43 is then rotated, which will in turn rotate the three threaded rods 39 through the medium of the sprocket chain and move the magazine 32 out of the frame 28. The film can then be removed by hand or automatically back on the reel 32, which is then removed. A new reel is then inserted in place of the one just removed, the end of the film being passed between the rollers 34 and 37 and secured to the reel 33. Sufficient slack is provided between rollers 34 and 37 to pass about the measuring wheel and the feed sprocket wheel 23, and the magazine is then returned to its operative position by the crank and locked in its returned position by the lever 44. The film is then placed about the measuring wheel and the holes in the film, for example the first hole on a picture is placed on one of the four marked teeth on the sprocket wheel 23, which teeth are always brought to a predetermined position by the positioning of the notch in the disc 46. The slack film is then wound up on the reels and the film can then be fed by closing the circuit through the motor 34 and shifting the rocking clutch member 27 into its clutching position.

The rocking clutch member 27 may be shifted in various ways, but I prefer to shift it by electro-magnetic means, and will now describe one form of mechanism of this type.

The member 27 is made in the form of a compound armature pivoted between two sets of magnets 50 and 51. These magnets as well as the member 27 are carried by the hub 16 of the drum, the magnets 50 being arranged to attract the one end of said member 27 to move it into the path of the member 26, while the other set of magnets 51 is arranged to reverse the movement of the member 27 and withdraw it from the member 26 to permit the drum to rotate without rotating the measuring sprocket wheel 23. 50ª is a coil mounted on one end of armature 27, and 27ª is an adjustable counterweight on said armature to counterbalance the coil 50ª.

In Fig. 5 I have diagrammatically shown the electrical connections for controlling the circuits through some of the electrical devices. In this figure, 52 designates a battery or source of electrical energy, one pole of which is connected to ground, while the other pole is connected to two contacts 53 and 54 of a switch combined with the control lever 44. This pole of the battery is also connected to a pole 55 of a hand switch 56. The other pole 57 of this switch 56 is connected to a contact 58 of the control switch which is parallel to contact 53 and is also connected to a bush 59 in electrical engagement with a ring 60. 61 is a second hand switch one pole 62 of which is connected to a contact 63 of the control switch and is parallel with contact 54. The switches 56 and 61 are interconnected, so that when either is moved to its closed position the other will be opened. The other pole 64 of switch 61 is connected to one pole of the motor 34 (for rotating the take-up reel), while the other pole of this motor is connected to a bush 65 in electrical contact with a second conducting ring 66. The conducting rings 60 and 66 are connected to the spokes 19 of the drum, but insulated therefrom. These rings 66 and 60 are in electrical connection with one pole of magnets 50 and 51 respectively, the other poles of the magnets being connected to ground. One pole of coil 50ª is connected to ring 66, while the other pole is connected to ground through a contact 50ᵇ, carried by the armature 27, but insulated therefrom, which closes the circuit to ground through the clutch member 26 when the clutch members are in engagement with each other.

67 is a bridge piece carried by the control lever 43, but insulated therefrom, and is arranged to close the circuit through contacts 53 and 58 when in one position and to close the circuit through contacts 54 and 63 when in the other position.

Assuming now that the parts are in the position shown in Fig. 5, a film is in position to be exhibited and the drum or compensating system rotated at the proper speed to exhibit a picture. The lever 43 is first shifted from the one extreme position to the other to unlock disc 46 and lock disc 47. This shifting of the control lever will open the circuit between contacts 53 and 58 and close the circuit between contacts 54 and 63. The hand switch 61 is now closed to close the circuit through motor 34 and magnets 50 to rotate the winding reel 33 and shift the clutch member or armature 27 into the path of member 26 to drive the feed sprocket 23 and move the film in timed relation to the compensating system. As the clutch member 27 is rotated at a high rate of speed, the member 26 is liable to be thrown ahead of the member 27 by the impact and again engaged as the member 27 catches up with it when the clutch is thrown into engaging position. I desire to avoid all danger of throwing the member 26 ahead by the impact of member 27 and accomplish this by coil 50$^a$. As the circuit is closed through magnets 50, it is also closed to one pole of coil 50$^a$ and as soon as contact 50$^b$ on member 27 engages member 26, the circuit will be closed through said coil. This closing of the circuit through coil 50$^a$ will cause a magnetic flux to flow through the end of member 27 which forms the core of coil 50$^a$, member 26, sprocket shaft 22, drum spindle 15, hub of drum and support for the member 27. This flow of the magnetic flux through the above mentioned parts will prevent the throwing forward of member 26 when engaged by member 27.

The take-up mechanism which forms no part of this invention is arranged to be frictionally driven at a speed in excess of the feed of the sprocket so as to always maintain tension on the film between the feed sprocket 23 and the take-up reel 33, but not sufficient torque to cause the sprocket wheel or its clutch member 26 to overrun the clutch member 27, so that the sprocket wheel 23 will be in part driven by the drum.

If it is desired to stop the film feed, the switch 61 is opened and switch 56 is closed, which will close the circuit through the magnets 51 and open the circuit through magnets 50 and motor 34.

The control lever not only locks the disc 46 and 47 in their proper positions, but also controls the circuit through the magnets 50 and 51 in such a way as to break the circuit through magnets 50 and motor 34 and close the circuit through magnets 51 to release the clutch before the disc 47 is released, so there is no danger of the operator shifting the magazine while the clutch is engaged and thereby tear the film. This control device also prevents the throwing in of the clutch until after the feed sprocket is released and the projection 34 is seated in the notch in disc 47.

The interconnection of the switches 56 and 61 provides means for preventing the circuit being closed through one set of clutch magnets when it is desired to close the circuit through the other.

The rocking clutch lever 27 is counterbalanced and so positioned that it will be retained in either of its thrown positions by centrifugal force, regardless of whether the circuit is closed through the magnets which last shifted the lever.

The advantages of my invention result from the provision of a projecting device having an optical compensating system and film feeding mechanism rotatable about a common axis, together with means for connecting the film feeding mechanism to the compensating system and disconnecting it therefrom to permit the free rotation of the compensating system when it is desired to stop the feed of the film, together with actuating mechanism therefor.

A further advantage results from the provision of means for locking the film feed mechanism in a predetermined position when it is desired to change the film to position said mechanism in a prearranged manner for threading the film to insure the centering of the successive pictures on the film with the compensating system.

Still another advantage results from the provision of a movable magazine for the film reels, together with means for moving the magazine, as well as locking means for the magazine moving means associated with the locking means for the film feeding mechanism which is so arranged that the film feeding mechanism is locked when the magazine moving means is unlocked and the magazine moving means is locked when the film feeding mechanism is unlocked.

A still further advantage results from the provision of automatic connections between the actuating mechanism for the clutch or connecting means between the compensating system and the film feed mechanism, and the interlocking mechanism which is so arranged that the clutch will be automatically disengaged before the film feed mechanism lock can be thrown in position, and which is also so arranged that the clutch cannot be thrown into engagement when the film feeding mechanism is locked.

Having now fully described my invention, what I claim and desire to protect by Letters Patent is:

1. A moving picture machine for continuously moving films comprising film feeding mechanism and a compensating system rotatable about a common axis, means for rotating said system in a continuous manner, driving connections between said compensating system and the film feeding mechanism to connect them to each other in a predetermined relation to each other to cause the film and compensating system to register with each other, and actuating mechanism for throwing said driving connections into and out of engagement.

2. A moving picture machine for continuously moving films comprising film feeding mechanism and a compensating system rotatable about a common axis, means for rotating said system in a continuous manner, driving connections between said compensating system and the film feeding mechanism comprising a counterbalanced lever arranged to be retained in its thrown position by centrifugal force and an engaging member therefor, said lever and engaging member being so positioned that when the lever is in engagement with the engaging member the film feeding mechanism and compensating system will register with each other, and actuating mechanism for throwing said driving connections into and out of engagement.

3. A moving picture machine for continuously moving films comprising film feeding mechanism and a compensating system rotatable about a common axis, means for rotating said system in a continuous manner, driving connections between said compensating system and the film feeding mechanism to connect them to each other in a predetermined relation to each other to cause the film and compensating system to register with each other, and electrically operated actuating mechanism for throwing said driving connections into and out of engagement.

4. A moving picture machine for continuously moving films comprising film feeding mechanism and a compensating system rotatable about a common axis, means for rotating said system in a continuous manner, a clutch member carried by the film feeding mechanism, a counterbalanced lever carried by the compensating system adapted to engage the clutch member when in one position and to clear the clutch member when in another position, the clutch member and lever being so positioned on the feeding mechanism and compensating system that when they are in engagement with each other the feeding mechanism and compensating system will be in picture exhibition relation to each other, said lever being so mounted that it will be retained in either of its positions by centrifugal force, and means for shifting said lever.

5. A moving picture machine for continuously moving films comprising film feeding mechanism and a compensating system rotatable about a common axis, means for rotating said system in a continuous manner, a clutch member carried by the film feeding mechanism, a counterbalanced lever carried by the compensating system adapted to engage the clutch member when in one position and to clear the clutch member when in another position, the clutch member and lever being so positioned on the feeding mechanism and compensating system that when they are in engagement with each other the feeding mechanism and compensating system will be in picture exhibition relation to each other, said lever being so mounted that it will be retained in either of its positions by centrifugal force, and electro-magnetic means for shifting said lever.

6. A moving picture machine for continuously moving films comprising film feeding mechanism and a compensating system rotatable about a common axis, means for rotating said system in a continuous manner, a clutch member carried by the film feeding mechanism, a counterbalanced lever carried by the compensating system adapted to engage the clutch member when in one position and to clear the clutch member when in another position, the clutch member and lever being so positioned on the feeding mechanism and compensating system that when they are in engagement with each other the feeding mechanism and compensating system will be in picture exhibition relation to each other, said lever being so mounted that it will be retained in either of its positions by centrifugal force, electro-magnetic means for shifting the lever in one direction, a second electro-magnetic means for shifting the lever in the other direction, and means for closing the circuit through either electro-magnetic means and for preventing the closing of the circuit through both of said electro-magnetic means simultaneously.

7. A moving picture machine for continuously moving films comprising film feeding mechanism, an optical compensating system, means for rotating said system in a continuous manner, a clutch interposed between said mechanism and said system, an electric circuit, electrically actuated means for shifting the clutch to either its clutching or free positions in said circuit, a lock for locking the film feeding mechanism in a predetermined position, and a switch controlled by the lock arranged to control the circuit through the electrically actuated means for shifting the clutch and prevent its engagement when the lock is in locking position.

8. A moving picture machine for continuously moving films comprising film feeding mechanism, an optical compensating system, means for rotating said system in a continuous manner, a clutch interposed between said mechanism and said system, an electric circuit, electrically actuated means for shifting the clutch to either its clutching or free positions in said circuit, a lock for locking the film feeding mechanism in a predetermined position, and a switch controlled by the lock arranged to control the circuit through the electrically actuated means to disengage the clutch and prevent its engagement when the lock is in locking position and to reestablish the circuit to permit the circuit to be closed to shift the clutch into clutching position when the feed mechanism is unlocked.

9. A moving picture machine for continuously moving films comprising film feeding mechanism, an optical compensating system, means for rotating said system in a continuous manner, a clutch interposed between said mechanism and said system, an electric circuit, electrically actuated means for shifting the clutch to either its clutching or free positions in said circuit, a lock for locking the film feeding mechanism in a predetermined position, a movable film feeding magazine, means for moving the magazine into feeding position and into charging position, a second lock for the magazine to lock it in feeding position associated with the first lock, and a control switch arranged to be actuated by the locks arranged to control the circuit to the electrically actuated means to disengage the clutch when the magazine moving means is unlocked and the lock is moved into position to lock the film feed and to also prevent the shifting of the clutch into clutching position while the film feed mechanism is locked.

10. A moving picture machine for continuosuly moving films comprising film feeding mechanism and a compensating system rotatable about a common axis, means for rotating said system in a continuous manner, the one being rotatably supported independent of the other to prevent vibration being transmitted from the compensating system to the film feeding mechanism, a clutch device between said compensating system and the film feeding mechanism, said clutch device being arranged to connect the feeding mechanism and compensating system to each other in picture exhibiting relation, and actuating mechanism for throwing said clutch device into and out of engagement.

In testimony of which invention, I have hereunto set my hand, at Philadelphia, Pa., on this 29th day of June, 1921.

SAMUEL BARDY.